(12) United States Patent
Lee

(10) Patent No.: US 8,444,317 B2
(45) Date of Patent: May 21, 2013

(54) MULTIPOSITION TEMPERATURE MEASURING CABLE

(75) Inventor: Yeu Yong Lee, Seoul (KR)

(73) Assignee: Chang Sung Ace Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/235,682

(22) Filed: Sep. 19, 2011

(65) Prior Publication Data

US 2012/0076170 A1    Mar. 29, 2012

(30) Foreign Application Priority Data

Sep. 28, 2010    (KR) ........................ 10-2010-0093581

(51) Int. Cl.
*G01K 7/02*         (2006.01)
*G01K 1/14*         (2006.01)
*G01K 3/06*         (2006.01)

(52) U.S. Cl.
USPC ............ 374/179; 374/153; 374/137; 136/200

(58) Field of Classification Search
USPC ................. 374/179, 208, 163, 137, 110, 112, 374/113, 166, 153, 141; 136/200
See application file for complete search history.

(56) References Cited

U.S. PATENT DOCUMENTS

| | | | | |
|---|---|---|---|---|
| 3,716,417 A * | 2/1973 | Evans | ............................ | 136/232 |
| 4,075,036 A * | 2/1978 | Lysikov et al. | ............... | 136/225 |
| 4,186,605 A * | 2/1980 | Bourigault | .................... | 374/115 |
| 4,242,907 A * | 1/1981 | Kazmierowicz | ............... | 374/113 |
| 4,624,582 A * | 11/1986 | Banda et al. | ................... | 374/181 |
| 4,718,777 A * | 1/1988 | Mydynski et al. | ............. | 374/181 |
| 5,011,543 A * | 4/1991 | Yokoi | ............................ | 136/211 |
| 5,066,140 A * | 11/1991 | Beran | ........................... | 374/134 |
| 5,106,204 A * | 4/1992 | Dunham | ......................... | 384/12 |
| 5,111,002 A * | 5/1992 | Hollander | ................... | 174/102 P |
| 5,356,220 A * | 10/1994 | Iida et al. | ....................... | 374/161 |
| 5,812,588 A * | 9/1998 | Deak et al. | ..................... | 374/166 |
| 5,821,861 A * | 10/1998 | Hartog et al. | ................. | 340/584 |
| 5,863,123 A * | 1/1999 | Lee | ................................ | 374/179 |
| 6,265,667 B1 * | 7/2001 | Stipes et al. | .............. | 174/102 R |
| 6,599,011 B2 * | 7/2003 | Daily et al. | ..................... | 374/166 |
| 6,640,199 B1 * | 10/2003 | Goldstein et al. | ............. | 702/134 |
| 7,044,638 B2 * | 5/2006 | Phillips | ......................... | 374/180 |

(Continued)

FOREIGN PATENT DOCUMENTS

| | | | |
|---|---|---|---|
| FR | 2672680 A1 * | 8/1992 | |
| GB | 2100003 A * | 12/1982 | |

(Continued)

*Primary Examiner* — Gail Verbitsky
(74) *Attorney, Agent, or Firm* — IPLA P.A.; James E. Bame

(57) ABSTRACT

Disclosed herein is a multiposition temperature cable, including: a measuring unit that includes a plurality of connectors, each being composed of a plus (+) terminal and a minus (−) terminal, in which each of the connectors measures a thermoelectromotive force; and a plurality of wire couples (thermocouples) that are connected to the plurality of connectors, wherein each of the wire couples includes a plus (+) junction wire, one end of which is connected to the plus (+) terminal, and a minus (−) junction wire, one end of which is connected to the minus (−) terminal, and the other end of the plus (+) junction wire and the other end of the minus (−) junction wire are connected to each other to form a hot junction with respect to each connector to form a closed circuit. The multiposition temperature cable can simultaneously measure temperatures at several positions in real time.

1 Claim, 2 Drawing Sheets

U.S. PATENT DOCUMENTS

| | | | |
|---|---|---|---|
| 7,084,342 B2 * | 8/2006 | Schuh | 136/230 |
| 7,994,416 B2 * | 8/2011 | Schuh | 136/230 |
| 8,033,719 B2 * | 10/2011 | Beutin et al. | 374/158 |
| 8,109,670 B2 * | 2/2012 | Al-Misfer | 374/139 |
| 2002/0150142 A1 * | 10/2002 | Sanderson | 374/144 |
| 2002/0172259 A1 * | 11/2002 | Bach | 374/208 |
| 2003/0016730 A1 * | 1/2003 | Daily et al. | 374/179 |
| 2008/0291964 A1 * | 11/2008 | Shrimpling et al. | 374/1 |
| 2009/0107537 A1 * | 4/2009 | Conti | 136/236.1 |
| 2013/0017628 A1 * | 1/2013 | Kosugi et al. | 438/14 |

FOREIGN PATENT DOCUMENTS

| | | | |
|---|---|---|---|
| JP | 58066830 A | * | 4/1983 |
| JP | 58083223 A | * | 5/1983 |
| JP | 02086927 A | * | 3/1990 |
| JP | 2004-150816 | | 5/2004 |

* cited by examiner

MULTIPOSITION TEMPERATURE MEASURING CABLE

CROSS REFERENCE

This application claims foreign priority under Paris Convention and 35 U.S.C. §119 to Korean Patent Application No. 10-2010-0093581, filed Sep. 28, 2010 with the Korean Intellectual Property Office.

BACKGROUND OF THE INVENTION

1. Technical Field

The present invention relates to a temperature measuring cable, and, more particularly, to a multiposition temperature measuring cable which can measure temperatures at several positions.

2. Description of the Related Art

The present invention relates to a temperature measuring cable.

Conventional temperature measuring cables or sensor wires are problematic in that they cannot simultaneously measure and observe temperature changes in real time at several positions because each cable or sensor wire can measure temperature at only one position.

In particular, conventional temperature measuring cables and sensor wires are problematic in that, when temperature changes must be observed at several positions, such as a circular turbine and the like, they must measure temperature with respect to each position of the circular turbine.

SUMMARY OF THE INVENTION

Accordingly, the present invention has been devised to solve the above-mentioned problems, and an object of the present invention is to provide a multiposition temperature measuring cable, which can simultaneously measure temperatures at several positions in real time because it includes wire couples having different lengths and a measuring unit for measuring the thermoelectromotive force of each of the wire couples and thus calculating the temperature of a hot junction of each of the wire couples.

Another object of the present invention is to provide a multiposition temperature measuring cable, which can simultaneously measure temperatures at several positions of a curved target as well as a planar target because wire couples are installed in an easily-flexible MI cable.

Still another object of the present invention is to provide a multiposition temperature measuring cable, which can be easily mounted on a target, such as a circular turbine or the like, whose temperature must be measured at several positions, and which can simultaneously measure temperatures at several positions of a circular turbine or the like.

Still another object of the present invention is to provide a multiposition temperature measuring cable, which can function as a communications cable.

In order to accomplish the above object, the present invention provides a multiposition temperature cable, including: a measuring unit that includes a plurality of connectors, each being composed of a plus (+) terminal and a minus (−) terminal, in which each of the connectors 11 measures a thermoelectromotive force; and a plurality of wire couples (thermocouples) that are connected to the plurality of connectors, wherein each of the wire couples includes a plus (+) junction wire, one end of which is connected to the plus (+) terminal, and a minus (−) junction wire, one end of which is connected to the minus (−) terminal; the other end of the plus (+) junction wire and the other end of the minus (−) junction wire are connected to each other to form a hot junction with respect to each connector, thus forming a closed circuit; the measuring unit includes microvoltmeter for measuring the change in thermoelectromotive force caused by the temperature change of the hot junctions; the plurality of wire couples have different lengths from each other to allow the hot junctions to be formed at different positions from each of the connectors; each of the wire couples is composed of two strands of different metal wires including a plus junction wire made of chromel and a minus junction wire made of alumel; and the plurality of wire couples are installed in a mineral insulator (MI) cable, the MI cable is coated with any one selected from copper, gold, platinum and silver, the MI cable further includes a communication wire for transmitting data, and the measuring unit further includes a communication terminal that connects the communication wire to external communication wires.

Further, the multiposition temperature measuring cable is rolled and mounted on a circular turbine such that the hot junctions are disposed at different positions of the circular turbine, thus measuring temperatures at several positions of the circular turbine. Furthermore the multiposition temperature measuring cable further includes a display unit that is connected to the measuring unit to display the positions of the hot junctions and the temperatures thereof.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
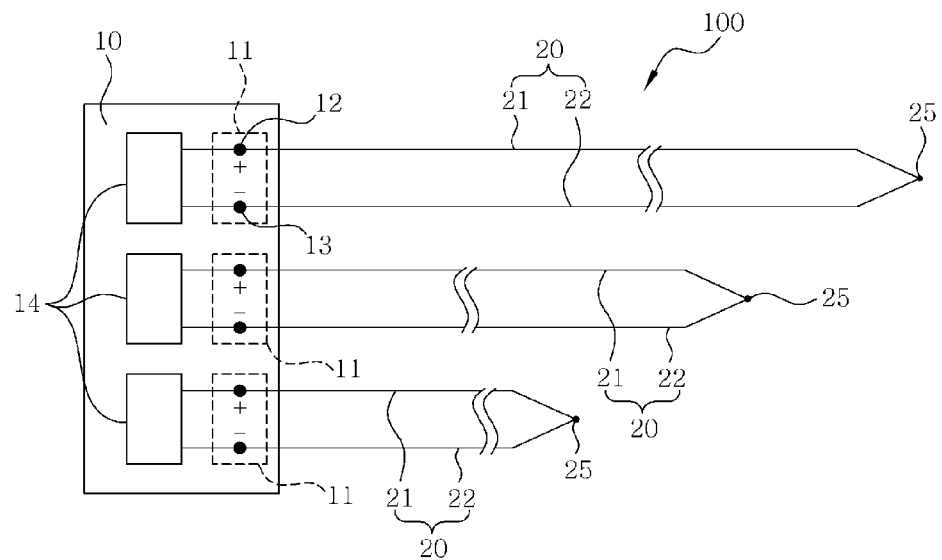
FIGS. 1 and 2 are schematic views each showing a multiposition temperature measuring cable according to an embodiment of the present invention.

Various objects, advantages and features of the invention will become apparent from the following description of embodiments with reference to the accompanying drawings The above and other objects, features and advantages of the present invention will be more clearly understood from the following detailed description taken in conjunction with the accompanying drawings.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Simple modifications, additions and substitutions of the present invention belong to the scope of the present invention, and the specific scope of the present invention will be clearly defined by the appended claims. Throughout the accompanying drawings, the same reference numerals are used to designate the same or similar components.

Hereinafter, preferred embodiments of the present invention will be described in detail with reference to the attached drawings.

Figure 2:
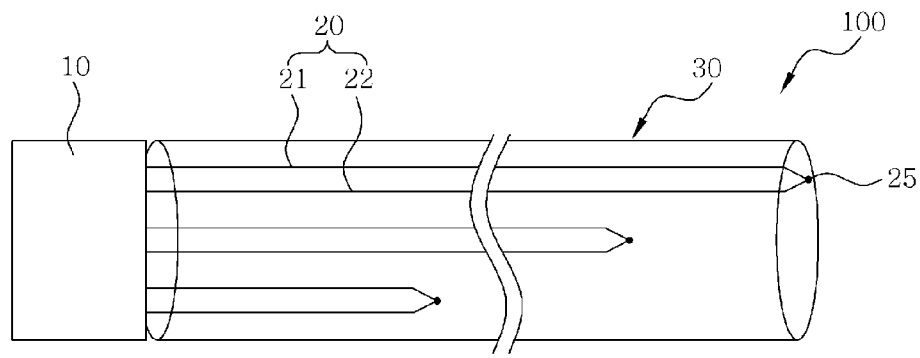

FIGS. 1 and 2 are schematic views each showing a multi-position temperature measuring cable according to an embodiment of the present invention.

A multiposition temperature cable 100 according to an embodiment of the present invention includes: a measuring unit that includes a plurality of connectors 11, each being composed of a plus (+) terminal 12 and a minus (−) terminal 13, in which each of the connectors 11 measures a thermoelectromotive force; and a plurality of wire couples 20 (thermocouples) that are connected to the plurality of connectors 11. Here, each of the wire couples 20 includes a plus (+) junction wire 21, one end of which is connected to the plus (+) terminal 12, and a minus (−) junction wire 22, one end of which is connected to the minus (−) terminal 13. The other end of the plus (+) junction wire 21 and the other end of the minus (−) junction wire 22 are connected to each other to form a hot junction 25 with respect to each connector 11.

The multiposition temperature cable 100 includes a measuring unit 10 and wire couples 20, which are thermocouples.

The measuring unit includes a plurality of connectors 11, each of which is composed of a plus (+) terminal 12 and a minus (−) terminal 13.

In each of the connectors 11, the wire couple 20, which is a thermocouple, is connected to the plus (+) terminal 12 and the minus (−) terminal 13.

In this case, the number of the connectors 11 and the number of the wire couples 20 can be variously determined depending on the circumstances that the multiposition temperature measuring cable 100 is applied to. In particular, the size of the wire couples 20, the number of the connectors 11 and the number of the wire couples 20 can be determined depending on the size of the following circular turbine and the number of temperature measuring positions thereof. However, generally, the number of the connectors 11 and the number of the wire couples 20 are each 3~5.

In this case, each of the wire couples 20 includes a plus (+) junction wire 21, one end of which is connected to the plus (+) terminal 12, and a minus (−) junction wire 22, one end of which is connected to the minus (−) terminal 13.

That is, one end of the plus (+) junction wire 21 and one end of the minus (−) junction wire 22 are connected to the plus (+) terminal 12 and minus (−) terminal 13 of the connector 11, respectively, and the other end of the plus (+) junction wire 21 and the other end of the minus (−) junction wire 22 are connected to each other by welding to form a hot junction 25, thereby forming a closed circuit with respect to each connector 11.

In this case, when the hot junction 25 is heated, a thermoelectromotive force is generated, and thus electric current flows through the wire couple 20. The electric current flowing through the wire couple 20 is measured by the measuring unit, thus measuring the temperature of the hot junction 25.

The wire couple 20, as a thermocouple, is composed of two strands of different metal wires.

That is, the plus junction wire 21 and the minus junction wire 22 are metal wires made of materials that are different from each other. The plus junction wire 21 may be made of chromel, and the minus junction wire 22 may be made of alumel.

That is, one end of the plus (+) junction wire 21 made of chromel is connected to the plus (+) terminal 12, and one end of the minus (−) junction wire 22 made of alumel is connected to the minus (−) terminal 13 with respect to each connector 11. The other end of the plus (+) junction wire 21 made of chromel and the other end of the minus (−) junction wire 22 made of alumel are connected to each other by welding to form the hot junction 25.

That is, the plus junction wire 21 made of chromel and the minus junction wire 22 made of alumel, which are two different kinds of metal wires, form a closed circuit together with the hot junction 15 with respect to each connector 11. The measuring unit 10 measures the thermoelectromotive force attributable to the increase in temperature of the hot junction 25, thus measuring the temperature of the hot junction 25 with respect to each connector 11.

The measuring unit 10 may include microvoltmeters 14 for measuring the change in thermoelectromotive force caused by the temperature change of the hot junction 25 of each of the wire couples 20.

That is, each of the microvoltmeters 14, which is connected to each of the connectors 11, measures the thermoelectromotive force changed by the temperature change of the hot junction 25 of each of the wire couples 20 to calculate the present temperature of each of the hot junctions 25.

Since the plurality of wire couples 20 have lengths different from each other, the hot junctions 25 can be formed at different positions from the corresponding connectors 11.

That is, since the wire couples 20, each including the plus junction wire 21 and minus junction wire 22, have lengths that are different from each other with respect to each connector 11, the hot junctions 25, each being formed by connecting the other end of the plus junction wire 21 with the other end of the minus junction wire 22, can be disposed at different positions from the corresponding connectors 11.

In this case, each of the wire couples 20 may be installed in a mineral insulator (MI) cable 30.

The MI cable 30 is an inorganic insulator cable for protecting metal tubes used for heat tracing, LCD process, heater and the like. In the present invention, the wire couples (conductors) 20, each including the plus junction wire 21 and the minus junction wire 22, are installed in the MI cable 30, and are protected by the MI cable 30.

That is, as in the present invention, when the MI cable is a heating cable, the MI cable is fabricated by disposing wire couples in the MI cable, interposing mineral insulators between the wire couples and metal tubes and then pressing the MI cable.

Since the raw material of this MI cable is selected from Cu, STS 316, Incoloy and STS 321 depending on its use, the MI cable is advantageous because its mechanical strength is higher than that of a general cable and its heat resistance is very excellent.

Further, Since the MI cable bends easily, it is easy to put it to practical use.

In this case, since the mineral insulator is made of magnesia (MgO) and is completely fixed in the MI cable by charging it in the tubes of the MI cable at a density of 2 to 3 $g/cm^2$, the mineral insulator is characterized in that it does not change the intervals between wire couples even when the MI cable is bent, and in that it is stable electrically and mechanically because it has excellent vibration resistance.

In this case, the MI cable 30 may be coated with any one selected from copper, gold, platinum and silver.

That is, since the MI cable 30 is coated with a metal having high thermal conductivity, such as copper, gold, platinum or silver, the temperature of the portion coming into contact with the MI cable 30 is transferred to the hot junction of each of the wire couples 20, thus accurately measuring the temperature thereof.

Figure 3:
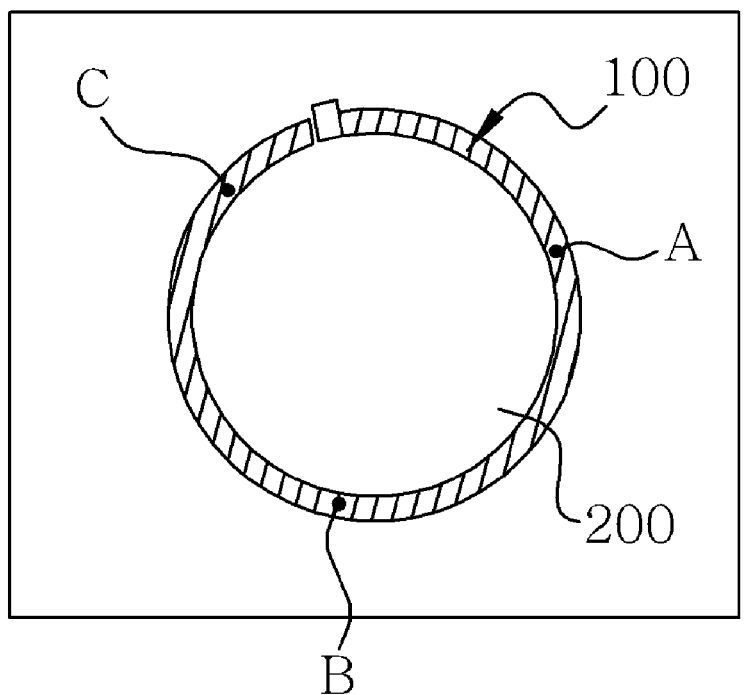
FIG. 3 is a schematic view in which the multiposition temperature measuring cable is mounted on a circular turbine.

FIG. 3 is a schematic view in which the multiposition temperature measuring cable 100 is rolled and mounted on a circular turbine 200.

Since the multiposition temperature measuring cable 100 of the present invention is rolled and mounted on the circular turbine 200 such that the hot junctions 25 are disposed at different positions of the circular turbine 200, temperatures can be measured at several positions of the circular turbine 200.

That is, when it is required to monitor or check the overload, abnormal operation or the like of the circular turbine 200 by measuring the temperature of each portion of the circular turbine 200, the multiposition temperature measuring cable 100 is configured such that the circular turbine 200 is surrounded by the multiposition temperature measuring cable 100 and the hot junctions are disposed at the positions of the circular turbine 200 whose temperatures must be measured, so that temperatures can be simultaneously measured at several positions of the circular turbine 200.

In this case, the multiposition temperature measuring cable 100 can be applied to various planar and curved targets that are in need of temperature measurement as well as the circular turbine 200.

Figure 4:
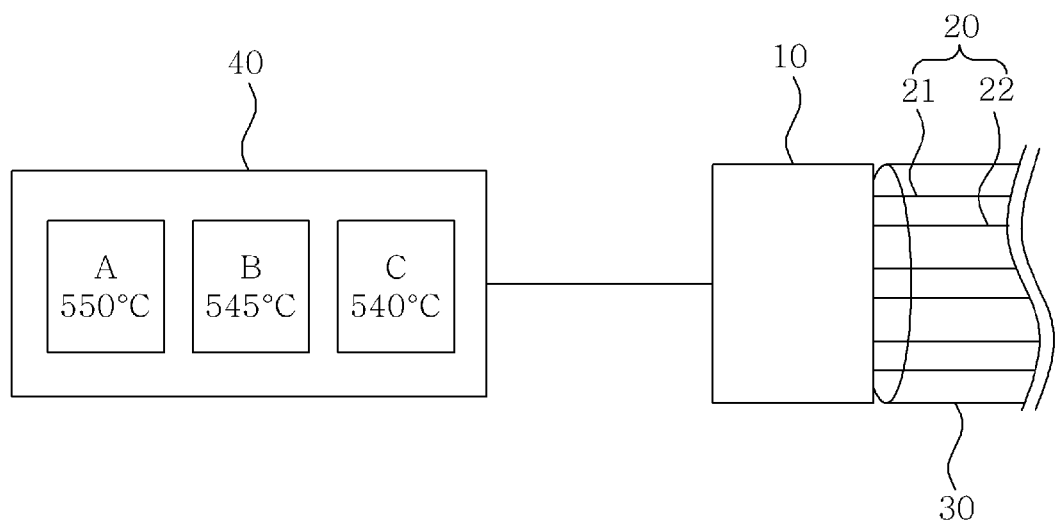
FIG. 4 is a schematic view showing the multiposition temperature measuring cable further including a display unit.

FIG. 4 shows a display unit 40 that display the positions of the hot junctions 25 and the temperatures thereof.

In this case, the points 'A', 'B' and 'C' of FIG. 4 represent the positions of the hot junctions 25. The items displayed on the display unit are merely illustrated by examples.

The multiposition temperature measuring cable 100 of the present invention may further includes a display unit 40 that is connected to the measuring unit 10 to display the positions of the hot junctions 25 and the temperatures thereof.

The display unit 40 is connected to the measuring unit 10, and displays the temperatures of the hot junctions 25, calculated by the microvoltmeters 14 connected to the connectors 14, and the positions of the hot junctions 25.

Owing to the display unit 40, a manager can easily and accurately check the temperature change of the several positions of the circular turbine 40 (that is, the portions at which the hot junctions 25 are placed), and, therefore, can rapidly cope with abnormal changes.

The MI cable 30 may further include a communications wire (not shown) for transmitting data.

In this case, the measuring unit may further include a communications terminal (not shown) that connects the communication wire to external communication wires.

In this case, one end of the communication wire is connected to the communication terminal, and the other end thereof extends to the outside by a predetermined length from one end of the MI cable 30 at which the measuring unit 10 is placed. Therefore, the multiposition temperature measuring cable 100 of the present invention can also serve as a communication cable.

As described above, the multiposition temperature measuring cable of the present invention can simultaneously measure temperatures at several positions in real time.

Further, the multiposition temperature measuring cable of the present invention can simultaneously measure temperatures at several positions of a curved target as well as a planar target.

Further, the multiposition temperature measuring cable of the present invention can be easily mounted on a target, such as a circular turbine or the like, that is in need of temperature measurement at several positions, and can simultaneously measure the temperatures at several positions of a circular turbine or the like.

Furthermore, according to the multiposition temperature measuring cable of the present invention, it can function as a communication cable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multiposition temperature cable, comprising:
a measuring unit that includes a plurality of connectors, each being composed of a plus (+) terminal and a minus (−) terminal, in which each of the connectors measures a thermoelectromotive force; and
a plurality of wire couples (thermocouples) that are connected to the plurality of connectors,
wherein each of the wire couples includes a plus (+) junction wire, one end of which is connected to the plus (+) terminal, and a minus (−) junction wire, one end of which is connected to the minus (−) terminal, wherein the plus (+) junction wire has a same length as the minus (−) junction wire,
wherein the other end of the plus (+) junction wire and the other end of the minus (−) junction wire are connected to each other to form a hot junction with respect to each connector, thus forming a closed circuit,
wherein the measuring unit includes microvoltmeter for measuring the change in thermoelectromotive force caused by the temperature change of the hot junctions,
wherein the plurality of wire couples have different lengths from each other to allow the hot junctions to be formed at different positions from each of the connectors,
wherein each of the wire couples is composed of two strands of different metal wires including a plus junction wire made of chromel and a minus junction wire made of alumel,
wherein the plurality of wire couples are installed in a flexible mineral insulator (MI) cable that bends easily, the MI cable is coated with, any one selected from copper, gold, platinum and silver, the MI cable further includes a communication wire for transmitting data, and the measuring unit further includes a communication terminal that connects the communication wire to external communication wires,
wherein the multiposition temperature measuring cable is rolled and mounted on a circular turbine such that the hot junctions are disposed at different positions of the circular turbine, thus measuring temperatures at several positions of the circular turbine, and the multiposition temperature measuring cable further includes a display unit that is connected to the measuring unit to display the positions of the hot junctions and the temperatures thereof, and
wherein the inside of the MI cable in which the plurality of wire couples are disposed is charged with a mineral insulator made of magnesia (MgO) at a density of about 2 to about 3 g/cm$^2$.

* * * * *